US 9,912,282 B2

(12) United States Patent
Kobayashi et al.

(10) Patent No.: US 9,912,282 B2
(45) Date of Patent: Mar. 6, 2018

(54) MOTOR CONTROL DEVICE

(71) Applicant: DENSO CORPORATION, Kariya, Aichi-pref. (JP)

(72) Inventors: Daisuke Kobayashi, Kariya (JP); Takashi Suzuki, Kariya (JP)

(73) Assignee: DENSO COPORATION, Kariya, Aichi-pref. (JP)

(*) Notice: Subject to any disclaimer, the term of this patent is extended or adjusted under 35 U.S.C. 154(b) by 0 days.

(21) Appl. No.: 15/273,476

(22) Filed: Sep. 22, 2016

(65) Prior Publication Data

US 2017/0104439 A1   Apr. 13, 2017

(30) Foreign Application Priority Data

Oct. 7, 2015 (JP) ................. 2015-199558

(51) Int. Cl.

| H02P 7/00 | (2016.01) |
| G05D 23/00 | (2006.01) |
| H02H 7/08 | (2006.01) |
| H02P 29/68 | (2016.01) |
| H02P 6/14 | (2016.01) |
| H02P 29/032 | (2016.01) |
| H02P 27/06 | (2006.01) |
| H02M 1/32 | (2007.01) |

(52) U.S. Cl.
CPC ............... *H02P 29/68* (2016.02); *H02P 6/14* (2013.01); *H02P 29/032* (2016.02); *H02M 2001/327* (2013.01); *H02P 27/06* (2013.01)

(58) Field of Classification Search
USPC ..... 318/472, 634, 641, 400.08, 568.22, 626, 318/62, 101
See application file for complete search history.

(56) References Cited

U.S. PATENT DOCUMENTS

| 7,952,236 B2 * | 5/2011 | Mitsutani ................. B60L 3/12 307/10.1 |
| 9,090,238 B2 * | 7/2015 | Kakihara ............. G01K 15/007 |
| 9,217,440 B2 * | 12/2015 | Kobayashi ............ F04D 27/004 |

(Continued)

FOREIGN PATENT DOCUMENTS

| JP | 2892899 B2 | 5/1999 |
| JP | 5163251 B2 | 3/2013 |

*Primary Examiner* — Eduardo Colon Santana
*Assistant Examiner* — Iftekhar Mustafa
(74) *Attorney, Agent, or Firm* — Knobbe, Martens, Olson & Bear, LLP

(57) ABSTRACT

A motor control device includes: a substrate on a heat sink; switching elements providing a power converter; a drive circuit IC having a pre-driver; a control circuit IC having a current control unit; first and second temperature detectors; and a temperature estimation unit of evaluation places. When the current control unit is halted after operation and is restarted after halt, the temperature estimation unit: stores estimated temperature and the first and second detected temperature at the halt; calculates, as an estimated gain, a ratio of a temperature difference at the halt to a temperature difference at restart; and estimates temperature at the restart based on a temperature difference obtained by multiplying a temperature difference between the first detected temperature and the estimated temperature at the halt by the estimated gain, and increased temperature.

6 Claims, 9 Drawing Sheets

(56) References Cited

U.S. PATENT DOCUMENTS

| | | | |
|---|---|---|---|
| 9,310,456 B2* | 4/2016 | Lim .................... | G01R 35/005 |
| 2013/0080039 A1* | 3/2013 | Nakamoto ............ | F02D 41/009 |
| | | | 701/113 |

* cited by examiner

MOTOR CONTROL DEVICE

CROSS REFERENCE TO RELATED APPLICATION

This application is based on Japanese Patent Application No. 2015-199558 filed on Oct. 7, 2015, the disclosure of which is incorporated herein by reference.

TECHNICAL FIELD

The present disclosure relates to a motor control device that controls energization of a motor.

BACKGROUND

There has been known a motor control device that detects or estimates a temperature of a motor or a power converter and limits a current command value in accordance with the temperature, so as to prevent breakdown of a switching element of the power converter that supplies power to the motor, an element of a control circuit, and the like, due to heat generated by an excess current. For example, a device disclosed in Patent Literature 1 estimates an increased temperature of a motor based on a current flowing in the motor. Further, during halting of current supply to the motor, the device estimates a decreased temperature of the motor from a heat radiation coefficient of the motor.

There is known a technique where a temperature of an evaluation place, which is correlated with a detected temperature of a temperature detector installed in one place on a substrate, is estimated based on the detected temperature. According to this known technique, when current supply is to be restarted after being halted, there is assumed a method in which a decreased temperature of the evaluation place during the halting period is estimated from a decreased temperature of the detection place during the halting period. Further, there is assumed a method in which an estimated temperature of the evaluation place during the halting is previously stored, and a temperature of the evaluation place at the time of the restart is estimated by the prior art of Patent Literature 1 based on a decreased temperature during the halting and an increased temperature estimated from a current at the time of the restart.

However, when an ambient temperature changes during the halting period of the current supply, the detected temperature of the temperature detector is affected by the change, making it impossible to correctly estimate the decreased temperature of the evaluation place. This as a result makes it impossible to correctly estimate the estimated temperature of the evaluation place at the time of the restart.

Patent Literature 1: JP 2892899

SUMMARY

It is an object of the present disclosure to provide a motor control device that can properly estimate a temperature of an evaluation place at the time of restart after halting, without being affected by a change in ambient temperature.

According to an aspect of the present disclosure, a motor control device for controlling energization of a motor includes: a substrate arranged on a heat sink to radiate heat generated at a time of energization; a plurality of switching elements arranged on the substrate and providing a power converter that supplies power to the motor; a drive circuit IC arranged on the substrate and having a pre-driver that outputs a drive signal to the plurality of switching elements; a control circuit IC arranged on the substrate and having a current control unit that calculates a command signal to the pre-driver based on an output command to the motor; a first temperature detector and a second temperature detector that detect temperature at two places of the heat sink, the control circuit IC, the drive circuit IC, the switching elements, and the motor; and a temperature estimation unit that estimates temperature of one or more evaluation places selected from the heat sink, the control circuit IC, the drive circuit IC, the switching elements and the motor, based on a current flowing through the motor, a first detected temperature detected by the first temperature detector and a second detected temperature detected by the second temperature detector. In a process where the current control unit is halted after operation and is restarted after halt, the temperature estimation unit: stores estimated temperature of the one or more evaluation places, the first detected temperature and the second detected temperature at a time of the halt of the current control unit; calculates, as an estimated gain, a ratio of a temperature difference between the first detected temperature and the second detected temperature at the time of the halt to a temperature difference between the first detected temperature and the second detected temperature at the time of restart; and estimates temperature of the one or more evaluation places at the time of the restart, based on a temperature difference obtained by multiplying a temperature difference between the first detected temperature and the estimated temperature of the one or more evaluation places at the time of the halt by the estimated gain, and an increased temperature calculated from an integrated value of the current flowing through the motor.

The motor control device of the present disclosure is characterized by detecting temperatures of two places by use of two temperature detectors. Further, attention is focused on that "the temperature difference between the first detected temperature and the second detected temperature" and "the temperature difference between the first detected temperature and the estimated temperature of the evaluation place" are proportional to each other regardless of the ambient temperature. Then, the temperature estimation unit estimates the temperature difference between the first detected temperature and the estimated temperature of the evaluation place at the time of the restart by multiplying the temperature difference at the time of the halting by the estimated gain.

Accordingly, the temperature estimation unit can properly estimate the temperature of the evaluation place at the time of the restart after the halting without being affected by a change in ambient temperature. Especially with the configuration where the current control unit limits the current command value based on the estimated temperature of the evaluation place, correctly estimating the temperature of the evaluation place can appropriately prevent breakdown of the element, and control the energization of the motor while holding an output of the motor as high as possible.

The two temperature detectors of the present disclosure may detect the temperatures of two places out of the five places recited above. This is mainly intended to "perform temperature estimation by use of two temperature detectors", and is not intended to exclude a configuration where temperatures of three or more places are detectable by use of three or more temperature detectors. Further, in a configuration where a temperature detector that detects a temperature of the control circuit IC, the drive circuit IC, or the switching element embedded in the IC package is provided, the temperature detector is preferably provided inside the IC package.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereinafter, motor control devices of embodiments will be described based on the drawings. Note that a first embodiment and a second embodiment are comprehensively referred to as a "present embodiment."

First Embodiment

Figure 1:
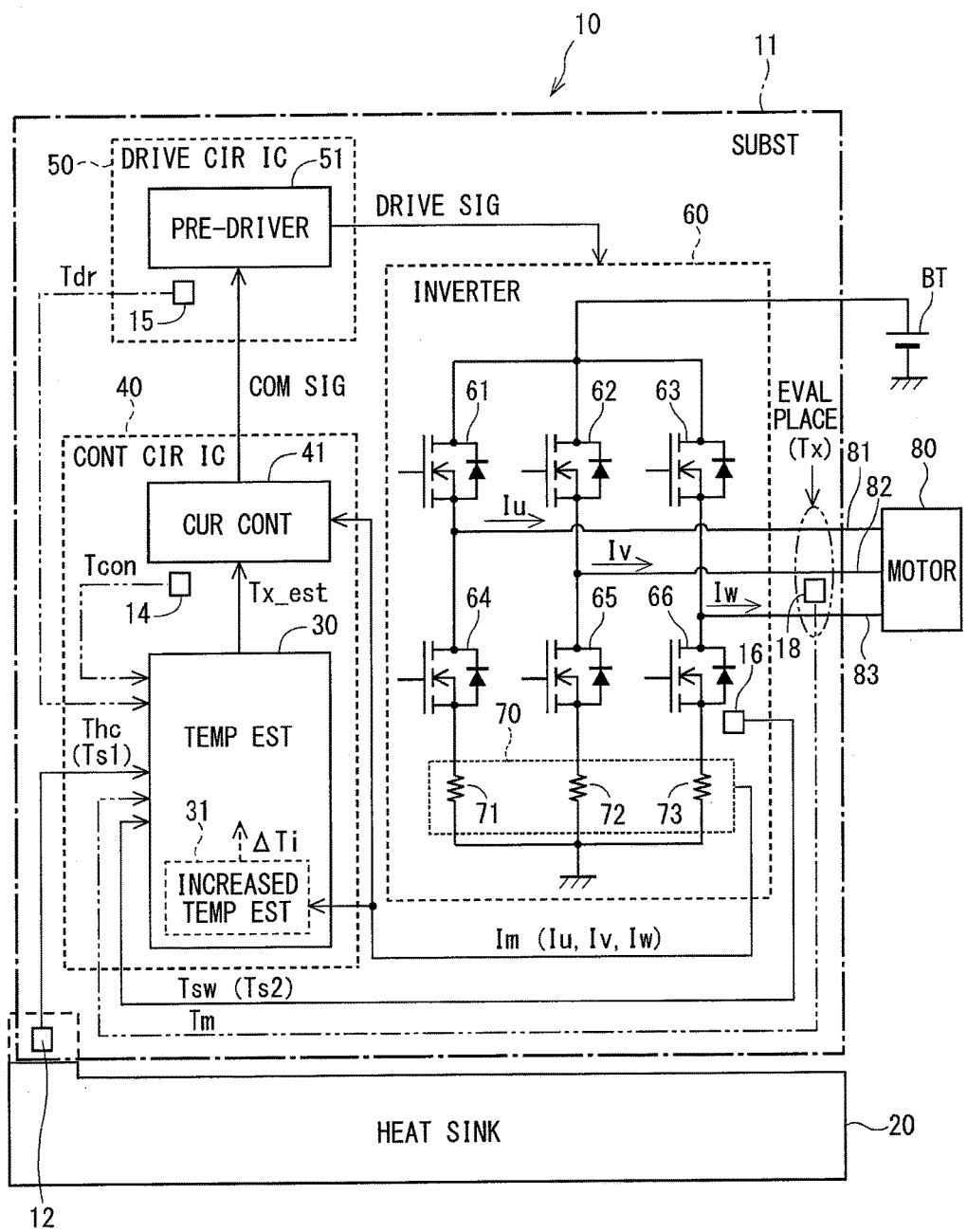
FIG. 1 is a schematic configuration diagram of a system applied with a motor control device of a first embodiment.

A motor control device of the present embodiment will be described with reference to FIGS. 1 to 7. First, FIG. 1 shows a whole configuration of a motor drive system applied with a motor control device. In the present embodiment, a motor control device that controls energization of a three-phase AC motor is exemplified. This three-phase AC motor is used as a steering assist motor that assists steering of a driver in an electric power steering device of a vehicle, for example.

A motor control device 10 of the present embodiment is basically made up of electronic components mounted on a substrate 11. That is, among those shown in FIG. 1, a battery BT, a motor 80, and a heat sink 20 are not included in the motor control device 10. Typically, the motor control device 10 is realized as an ECU. A rotation angle sensor that detects a rotation angle of the motor 80 is omitted in FIG. 1.

The motor control device 10 includes a control circuit IC 40, a drive circuit IC 50, a plurality of switching elements 61 to 66 constituting an inverter 60 as a "power converter", a plurality of temperature detectors 12, 14, 15, 16, 18, and the like. A power source relay, a coil, a capacitor, and the like, which are generally provided in a power input unit, are omitted in FIG. 1. Further, the motor control device 10 of the present embodiment includes a temperature estimation unit 30. The temperature estimation unit 30 may be, for example, included in the control circuit IC 40, or may be configured in an IC different from the control circuit IC 40.

The control circuit IC 40 and the drive circuit IC 50 are each mounted in the form of an IC package on the substrate 11. The control circuit IC 40 has a current control unit 41 that calculates a command signal relating to energization on the basis of a torque command to the motor 80. Typically, the control circuit IC 40 is made up of a microcomputer.

The drive circuit IC 50 has a pre-driver 51 that outputs drive signals to the plurality of switching elements 61 to 66 of the inverter 60 on the basis of the command signal calculated by the current control unit 41. The drive circuit IC 50 is used in the form of a customized ASIC, for example.

Six switching elements 61 to 66 mounted on the substrate 11 are bridge-connected to the inverter 60. The switching elements 61, 62, 63 are high potential-side switching elements of a U-phase, a V-phase, and a W-phase, and the switching elements 64, 65, 66 are low potential-side switching elements of the U-phase, the V-phase, and the W-phase. In the present embodiment, a MOSFET is used as each of the switching elements 61 to 66. In another embodiment, a field effect transistor, an IGBT, or the like may be used other than the MOSFET.

By operation of the switching elements 61 to 66 of the respective phases in accordance with drive signals from the pre-driver 51, the inverter 60 converts DC power of the battery BT to AC power, and supplies phase currents Iu, Iv, Iw to the respective phase wires 81, 82, 83. Thereby, the motor 80 is driven so as to output torque in accordance with a torque command.

In the present embodiment, shunt resistors 71, 72, 73 that detect the phase currents Iu, Iv, Iw are provided between a ground and the low potential-side switching elements 64, 65, 66 of the respective phases. The shunt resistors 71, 72, 73 are collectively denoted as a current detector 70. The current detector 70 may be provided in a current channel from the inverter 60 to each of the wires 81, 82, 83. Further, currents which include the phase currents Iu, Iv, Iw of a fixed coordinate system and d-q axis currents Id, Iq of a rotary coordinate system and flow in the motor 80, are comprehensively referred to as a "motor current Inn."

In association with the energization of the motor 80 by the switching operation of the inverter 60, heat is generated especially in the switching elements 61 to 66 and a power current channel on the substrate 11. The generated heat is transmitted through the substrate 11, to also increase temperatures of the control circuit IC 40 and the drive circuit IC 50. When the heat generation becomes excessive, electronic elements including the switching elements 61 to 66 might be broken down. Hence the substrate 11 is installed so as to radiate heat, generated at the time of the energization, to the heat sink 20 such as an aluminum housing. For example, a ground channel of the substrate 11 is fitted so as to be in contact with the heat sink 20.

Further, a plurality of temperature detectors 12, 14, 15, 16, 18 are provided in the respective parts of the substrate 11. The temperature detectors 12, 14, 15, 16, 18 are typical thermistors.

FIG. 1 shows temperature detectors in five places. However, the temperature detectors are not necessarily constantly provided in five places, and only have to be provided in at least two places of these five. Roles and installation forms of the temperature detectors 12, 14, 15, 16, 18 in the five places will be sequentially described.

The temperature detector 12 detects a temperature Ths of the heat sink 20. In the example of FIG. 1, the temperature detector 12 is installed in the ground channel portion on the substrate 11 which is in contact with the heat sink 20.

Figure 2A:
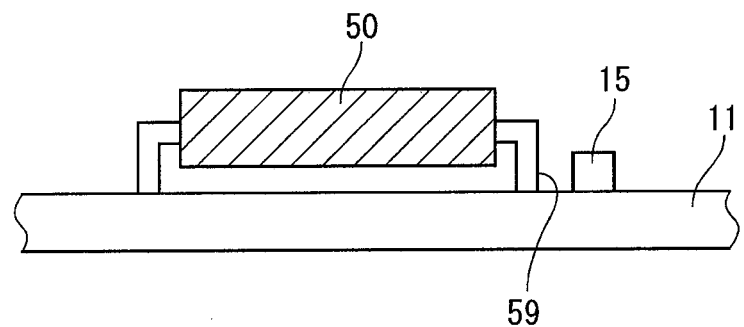
FIGS. 2A and 2B are schematic views showing configurations where a temperature detector is installed on a substrate (FIG. 2A) and a temperature detector is installed inside an IC package (FIG. 2B)
Figure 2B:
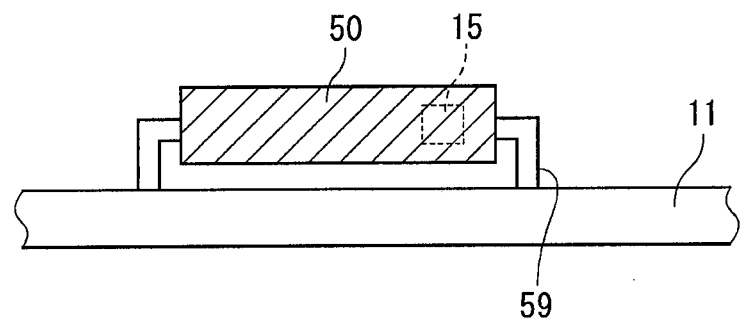

The temperature detector 14 detects a temperature Tcon of the control circuit IC 40. The temperature detector 15 detects a temperature Tdr of the drive circuit IC 50. As shown in FIG. 2A with the drive circuit IC 50 taken as a representative example, the temperature detector 15 may be installed on the substrate 11 in the vicinity of the lead unit 59 of the drive circuit IC 50. Further, as shown in FIG. 2B, when the temperature detector 15 is provided inside the IC package, the temperature detector 15 can be prevented from falling at the time of application of bending stress to the substrate 11, and at some other time. Hence it is preferable to provide the temperature detector 14 and the temperature detector 15 inside the IC package.

The temperature detector 16 detects a temperature Tsw of each of the switching elements 61 to 66. When the upper and lower arms of the phases are assumed to be equal in the switching heat generation, the temperature detector 16 is, for example, installed near any representative switching element. For example, in the form of the plurality of switching elements 61 to 66 having been modularized and embedded into the IC package, it is preferable to provide the temperature detector 16 inside the IC package similarly to the control circuit IC 40 and the drive circuit IC 50. Further, in the form of having a temperature-sensitive diode inside the switching element, the temperature-sensitive diode may be used as the temperature detector.

The temperature detector 18 detects a temperature Tm of the motor 80. In the example of FIG. 1, the temperature detector 18 is installed near the current channel on the substrate 11 which is connected to each of the phase wires 81, 82, 83.

Based on detected temperatures of the two temperature detectors, the temperature estimation unit 30 estimates a temperature Tx of one or more "evaluation places" selected from the heat sink 20, the control circuit IC 40, the drive circuit IC 50, the switching elements 61 to 66, and the motor 80. The temperature Tx of the evaluation place varies depending on a difference in distance from the heat generation unit or in heat radiation characteristics at the time of the energization, the time elapsed from halting of the energization, or the like. FIG. 1 exemplifies the case of estimating the temperature of the motor 80 as one evaluation place.

Hereinafter, the two temperature detectors used for temperature estimation will be referred to as a "first temperature detector" and a "second temperature detector." Further, a detected temperature of the first temperature detector will be referred to as a "first detected temperature Ts1", and a detected temperature of the second temperature detector will be referred to as a "second detected temperature Ts2." It is basically preferable here to take a lower temperature as the first detected temperature Ts1. FIG. 1 exemplifies the temperature Ths of the heat sink 20 as the first detected temperature Ts1.

As indicated by a solid line in FIG. 1, for example, the temperature Ths of the heat sink 20 detected by the first temperature detector 12 is inputted into the temperature estimation unit 30 as the first detected temperature Ts1. Further, the temperature Tsw of each of the switching elements 61 to 66 detected by the second temperature detector 16 is inputted into the temperature estimation unit 30 as the second detected temperature Ts2. In another example, as indicated by a two-dot chain line, the temperature Tcon, Tdr, or Tm of the control circuit IC 40, the drive circuit IC 50, or the motor 80, detected by the temperature detectors 14, 15, or 18 may be inputted into the temperature estimation unit 30 as the first detected temperature Ts1 or the second detected temperature Ts2.

In the configuration where three or more temperature detectors are provided, the following temperature estimation is implemented as one processing by combination of two temperature detectors out of the three or more temperature.

For example, a plurality of estimated temperatures may be calculated by a plurality of combination patterns. Further, the temperature estimation may be implemented by selecting an optimal combination pattern as needed. Moreover, the temperature detector other than the two temperature detectors used for the temperature estimation of the present embodiment may be used for another intended purpose.

An increased temperature estimation unit 31 in the temperature estimation unit 30 estimates an increased temperature $\Delta Ti$ associated with energization in the evaluation place based on an integrated value of the motor current Im. The increased temperature $\Delta TI$ is estimated based on Formula (1) of a Joule heat. Here, Q represents a Joule heat [J], R represents a resistance [Ω], Im represents a current [A], and t represents time [s].

$$Q = R \times Im^2 \times t \tag{1}$$

Based on these pieces of information, the temperature estimation unit 30 estimates a temperature of the motor 80 that is the evaluation place and outputs an estimated temperature Tx_est to the current control unit 41.

Figure 3:
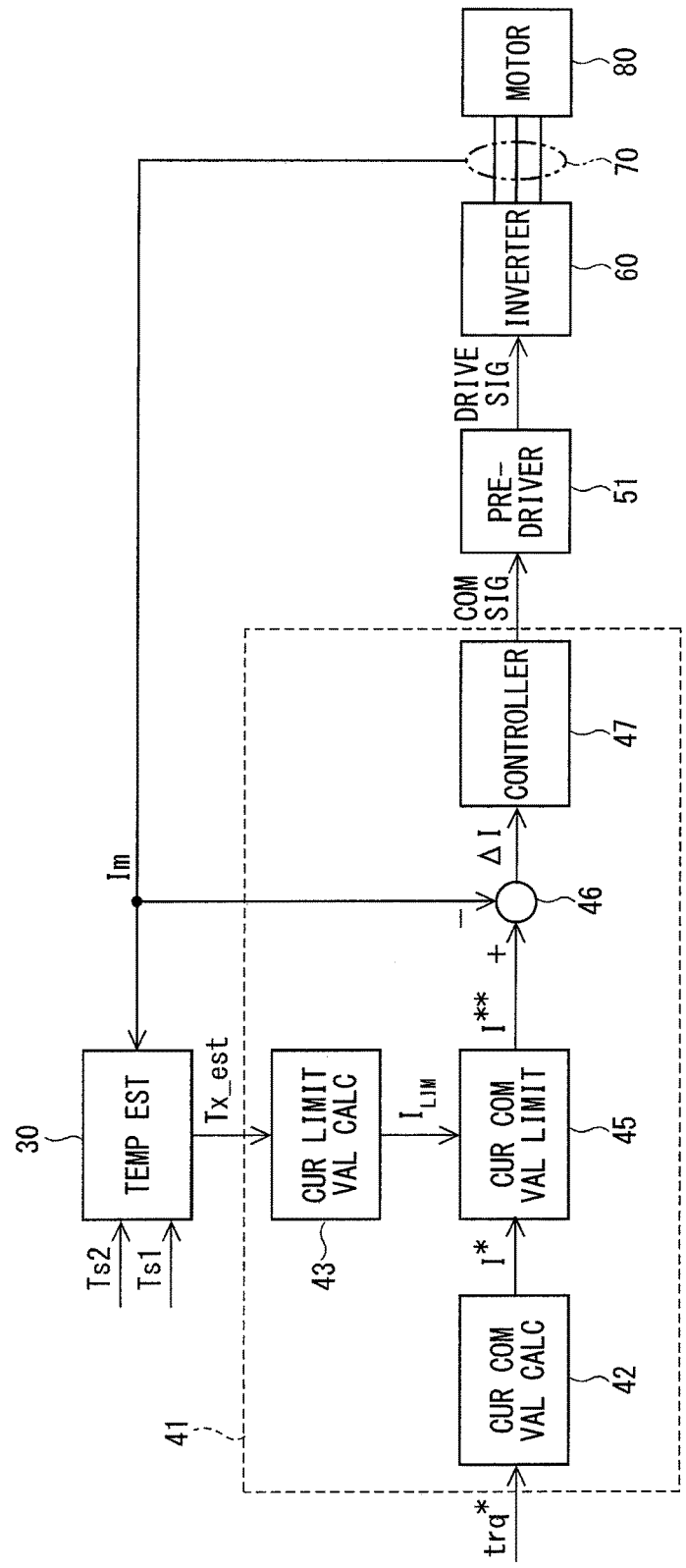
FIG. 3 is an overall control block diagram of the motor control device of the first embodiment.

Next, the overall control configuration of the motor control device 10 will be described with reference to FIG. 3.

The current control unit 41 has a current command value calculation unit 42, a current limit value calculation unit 43, a current command value limitation unit 45, a subtracter 46, a controller 47, and the like. A known configuration of coordinate conversion concerning vector control is omitted in the figure and description. For example, according to common technical knowledge, a value described as a "current command value I*" is interpreted as meaning a d-axis current command value Id* and a q-axis current command value Iq* in the vector control.

The current command value calculation unit 42 calculates the current command value I* based on a torque command trq* that is an "output command to the motor 80."

The current limit value calculation unit 43 calculates a current limit value $I_{LIM}$ with respect to the current command value I*, based on the estimated temperature Tx_est, which is estimated by the temperature estimation unit 30, of the evaluation place. For example, there is used a map as shown in FIG. 4 which specifies the relation between the estimated temperature Tx_est and the current limit value $I_{LIM}$.

Figure 4:
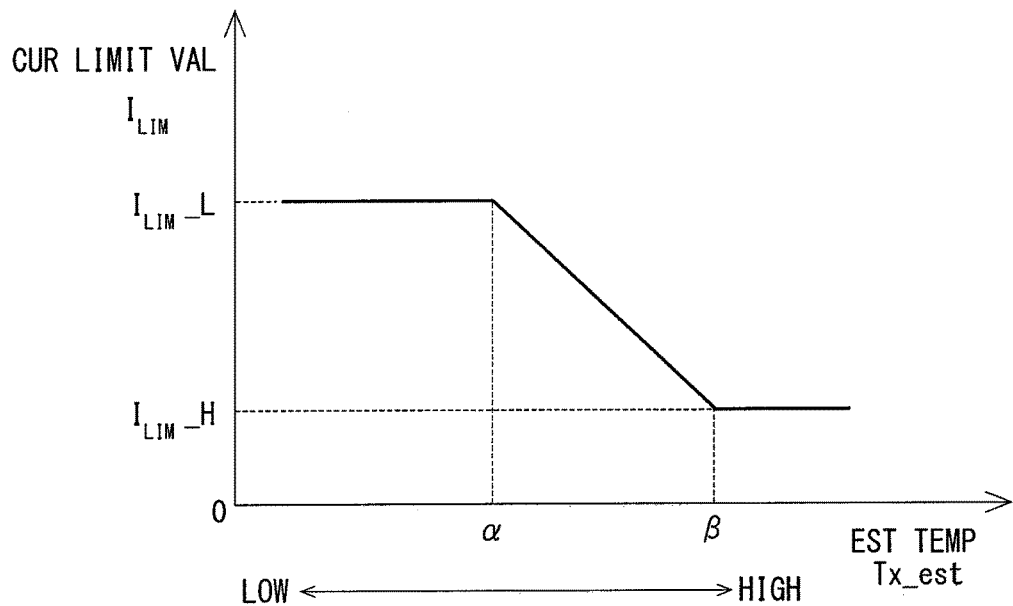
FIG. 4 is a map showing a relation between an estimated temperature of an evaluation place and a current limit value.
Figure 5:
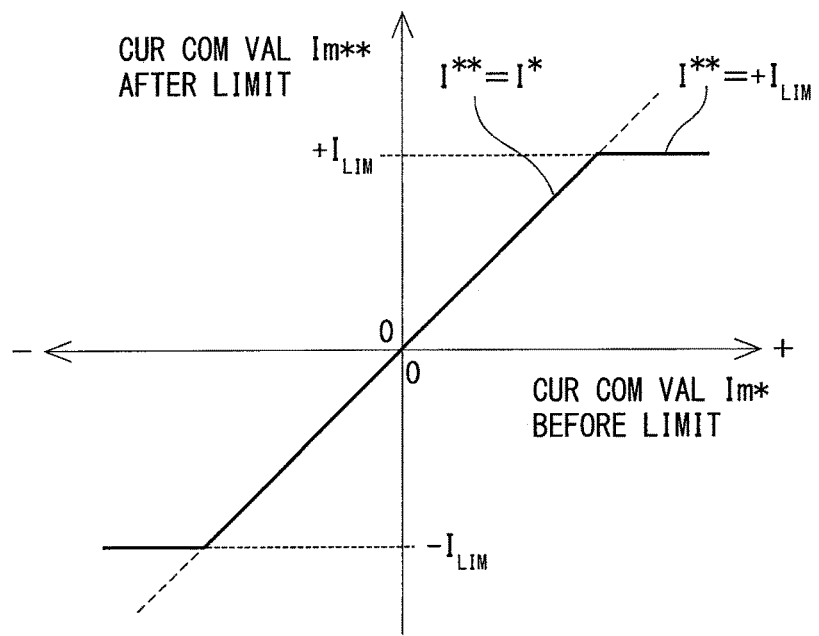
FIG. 5 is a current command value limitation map.

In the map of FIG. 4, in a range from a low temperature-side temperature α to a high-temperature-side temperature β, the higher the estimated temperature Tx_est, the lower the current limit value $I_{LIM}$ is set. When the estimated temperature Tx_est is not higher than the temperature α, a current limit value $I_{LIM}$_L for low temperature is set. When the estimated temperature Tx_est is not lower than the temperature β, a current limit value $I_{LIM}$_H for high temperature is set. The current limit value $I_{LIM}$_H for high temperature is, for example, set to be about 30% with respect to the current limit value $I_{LIM}$_L for low temperature.

According to this map, when the estimated temperature Tx_est of the evaluation place is not higher than the temperature α, it is determined not to affect the heat resistance of the element, and the output of the motor 80 is improved without limiting the current command value I* as much as possible. On the other hand, when the estimated temperature Tx_est of the evaluation place exceeds the temperature α, it is determined to have the possibility to affect the heat resistance of the element, and the current command value I* is limited to low to prevent breakdown of the element. However, when the current limit value $I_{LIM}$ is lowered to a vicinity of the zero, drive of the motor 80 is substantially halted. In the present embodiment, priority is given to continuing the drive of the motor 80 even with a low output, and when the estimated temperature Tx_est of the evaluation place is not lower than the temperature β, the minimum necessary current limit value $I_{LIM\_H}$ is set.

The current command value limitation unit 45 limits the current command value I* by use of the current limit value $I_{LIM}$ and outputs the current command value I** after the limitation. That is, when the current command value I* is positive in the map of FIG. 5, in the range of the current command value I* being not larger than a current limit value $+I_{LIM}$, "I**=I*" is set. Further, in the range of the current command value I* exceeding the current limit value $+I_{LIM}$, "I**=$+I_{LIM}$" is set.

Further, for example in the case of the motor 80 used as the steering assist motor of the electric power steering device, currents in both positive and negative directions are equally supplied in accordance with a rotational direction of the motor 80 which corresponds to a steering direction. In this case, the current limitation map in the negative region is specified to be point-symmetrical to the map in the positive region with respect to the origin.

The subtracter 46 calculates a current deviation ΔI between the motor current Im detected by the current detector 70 and the current command value I after limitation. The controller 47 calculates a command signal, typically a voltage command signal or the like, by PI control calculation or the like, so as to converge the current deviation ΔI to zero. The command signal calculated by the current control unit 41 in this manner is outputted to the pre-driver 51**.

Figure 6:
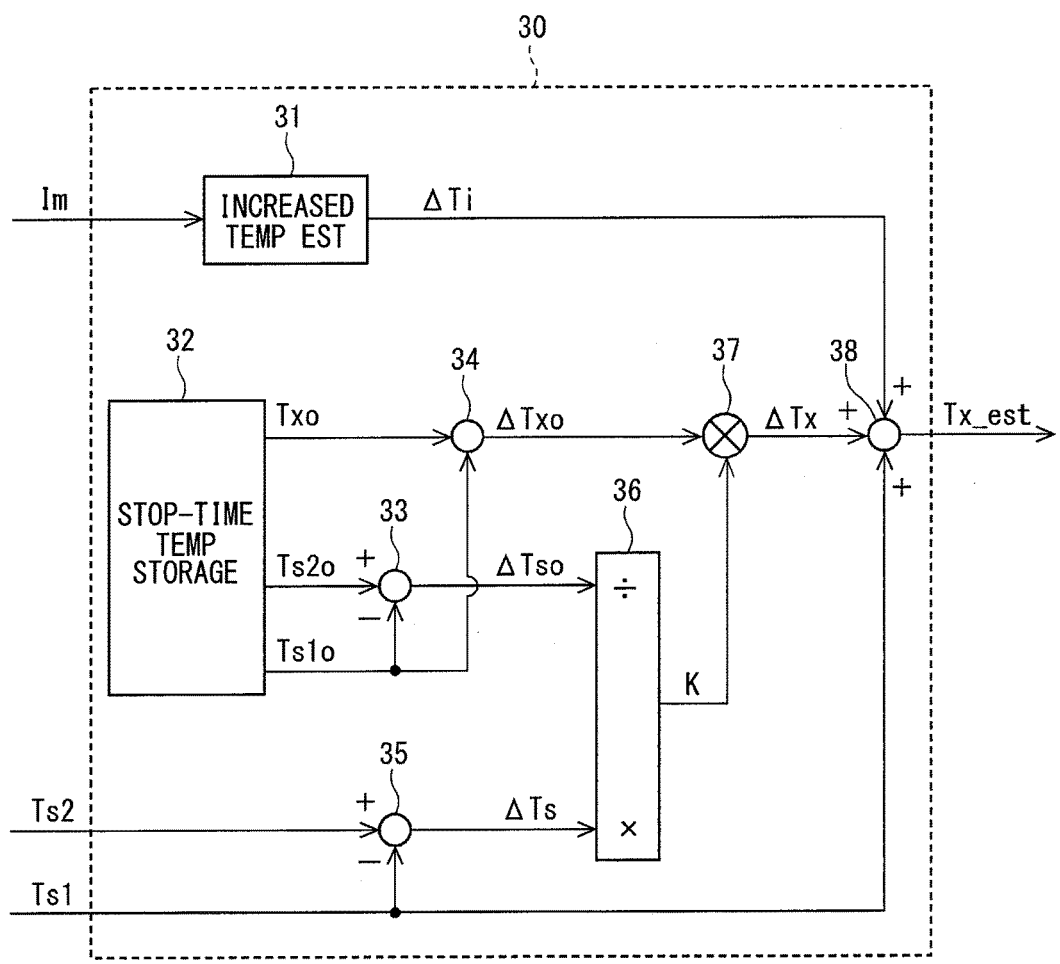
FIG. 6 is a block diagram of a temperature estimation unit of FIG. 3.

Subsequently, a detailed configuration of the temperature estimation unit 30 will be described with reference to FIG. 6. The temperature estimation unit 30 of the present embodiment is particularly characterized by its temperature estimation in the process of the current control unit 41 being halted after operated, and then restarted. "The current control unit 41 in operation" specifically corresponds to a microcomputer in operation. Further, that the operation of the current control unit 41 is halted means that the current supply to the motor 80 is halted. Hence the above process can be restated to the process of once halting the current supply to the motor 80 and then restarting the current supply. "Tx_est" as a final output value of the temperature estimation unit 30 represents the estimated temperature of the evaluation place at the time of the restart.

An object of the temperature estimation unit 30 of the present embodiment is to properly estimate the temperature of the evaluation place at the time of the restart without being affected by an ambient temperature even when the ambient temperature has changed during the halting period of the current control unit 41. As a configuration to achieve the object, the temperature estimation unit 30 includes the increased temperature estimation unit 31, a stoppage-time temperature storage unit 32, subtracters 33, 34, 35, a gain calculator 36, a multiplier 37, an adder 38, and the like.

As described above, the temperature estimation unit 30 repeatedly acquires the first detected temperature Ts1, the second detected temperature Ts2, and the motor current Im. Then, the increased temperature estimation unit 31 estimates the increased temperature ΔTi associated with energization in the evaluation place based on the integrated value of the motor current Im. During operation of the current control unit 41, the estimated temperature Tx, estimated based on the increased temperature ΔTi, of the evaluation place is repeatedly updated in accordance with a change in the motor current Im.

When the operation of the current control unit 41 is halted, the stoppage-time temperature storage unit 32 stores a first detected temperature Ts1o, a second detected temperature Ts2o, and an estimated temperature Txo of the evaluation place at the time of the halting. The subtracter 33 calculates a temperature difference ΔTso between the first detected temperature Ts1o and the second detected temperature Ts2o at the time of the halting. The subtracter 34 calculates a temperature difference ΔTxo between the first detected temperature Ts1o and the estimated temperature Txo of the evaluation place at the time of the halting.

The subtracter 35 calculates a temperature difference ΔTs between the first detected temperature Ts1 and the second detected temperature Ts2, which changes with time. Especially in this temperature estimation, it is technically meaningful to calculate the temperature difference ΔTs acquired at the time restart of the current control unit 41.

The gain calculator 36 calculates, as an estimated gain K, a ratio of the temperature difference ΔTso between the first detected temperature Ts1 and the second detected temperature Ts2 at the time of the halting and the temperature difference ΔTs at the time of the restart. The estimated gain K is expressed by Formula (2):

$$K=\Delta Ts/\Delta Tso=(Ts2-Ts1)/(Ts2o-Ts1o) \quad (2)$$

Since the temperature difference ΔTs is gradually converged during the halting period, K is a value smaller than 1.

In the present embodiment, it is assumed that during the halting period, "the temperature difference ΔTs between the first detected temperature Ts1 and the second detected temperature Ts2" and "the temperature difference ΔTx between the first detected temperature Ts1 and the estimated temperature Tx of the evaluation place" are proportional to each other regardless of the ambient temperature. Then, in the multiplier 37, "the temperature difference ΔTxo between the first detected temperature Ts1o and the estimated temperature Txo of the evaluation place at the time of the halting" is multiplied by the estimated gain K, to calculate "the temperature difference ΔTx between the first detected temperature Ts1 and the estimated temperature of the evaluation place in a non-energization state at the time of the restart." The temperature difference ΔTx is expressed by Formula (3):

$$\Delta Tx=K\times\Delta Txo=K\times(Txo-Ts1o) \quad (3)$$

However, at the time of the restart, a current starts to flow in the vicinity of the evaluation place, thereby requiring addition of the increased temperature ΔTi associated with energization. In the adder 38, the temperature difference ΔTx and the increased temperature ΔTi are added to the first detected temperature Ts1 that is a reference temperature, to calculate the estimated temperature Tx_est of the evaluation place at the time of the restart. The estimated temperature Tx_est of the first embodiment is expressed by Formula (4):

$$Tx\_est=Ts1+\Delta Tx+\Delta Ti \quad (4)$$

After calculating the estimated temperature Tx_est of the evaluation place at the time of the restart as thus described, the temperature estimation unit 30 continuously estimates the temperature Tx of the evaluation place after the restart.

Next, a function effect of the first embodiment will be described while being compared with a comparative example.

First, a configuration and a function of the comparative example will be described with reference to FIGS. 9 and 10. This comparative example is to estimate a temperature of the evaluation place by use of one temperature detector. In the figure of the comparative example, the symbols Im, ΔTi, Txo, and Tx_est in the figure of the first embodiment are used. Further, a detected temperature of the one temperature detector is denoted as "Ts", and a detected temperature at the time of the halting is denoted as "Tso." A decreased temperature peculiar to the comparative example is represented as "_dn" subsequent to "Ts" or "Tx."

Figure 9:
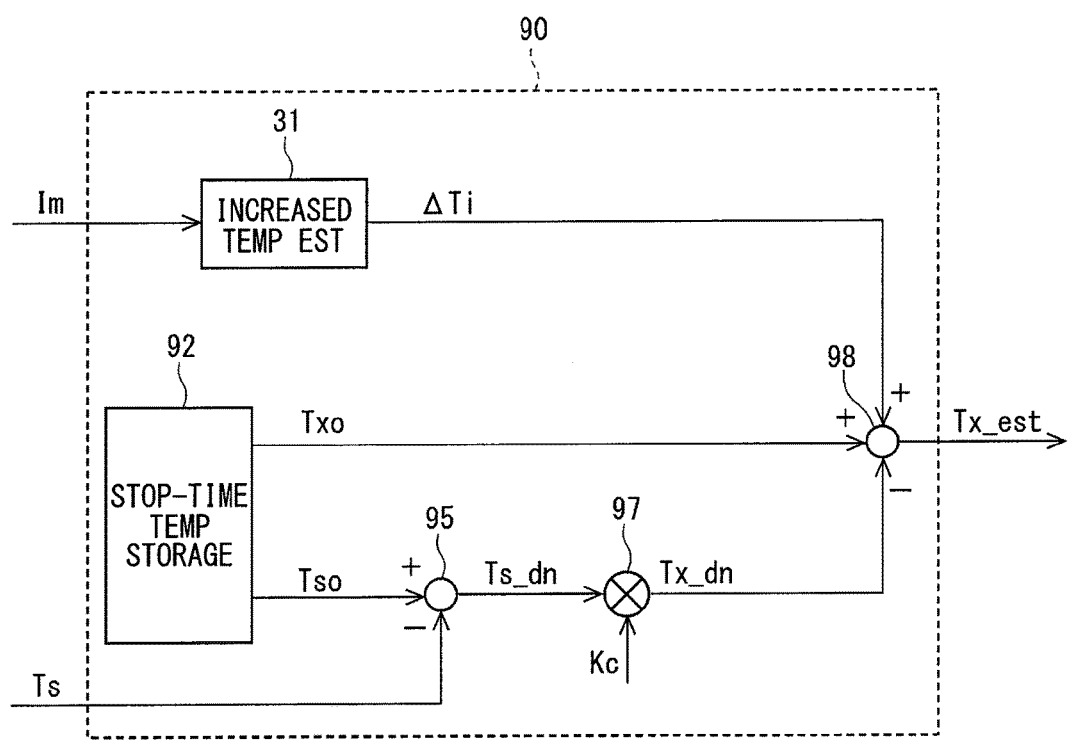
FIG. 9 is a block diagram of a temperature estimation unit of a comparative example.

As shown in FIG. 9, a temperature estimation unit 90 of the comparative example includes the increased temperature estimation unit 31, a stoppage-time temperature storage unit 92, a subtracter 95, a multiplier 97, an adder-subtracter 98, and the like. The increased temperature estimation unit 31 added with the same sign of the first embodiment has substantially the same configuration, and its description will thus be omitted. When the operation of the current control unit 41 is halted, the stoppage-time temperature storage unit 92 stores a detected temperature Tso at the time of the halting, and the estimated temperature Txo of the evaluation place. The estimated temperature Txo of the evaluation place is a temperature estimated from the increased temperature ΔTi based on an integrated value of the motor current Im during the operation.

Figure 10:
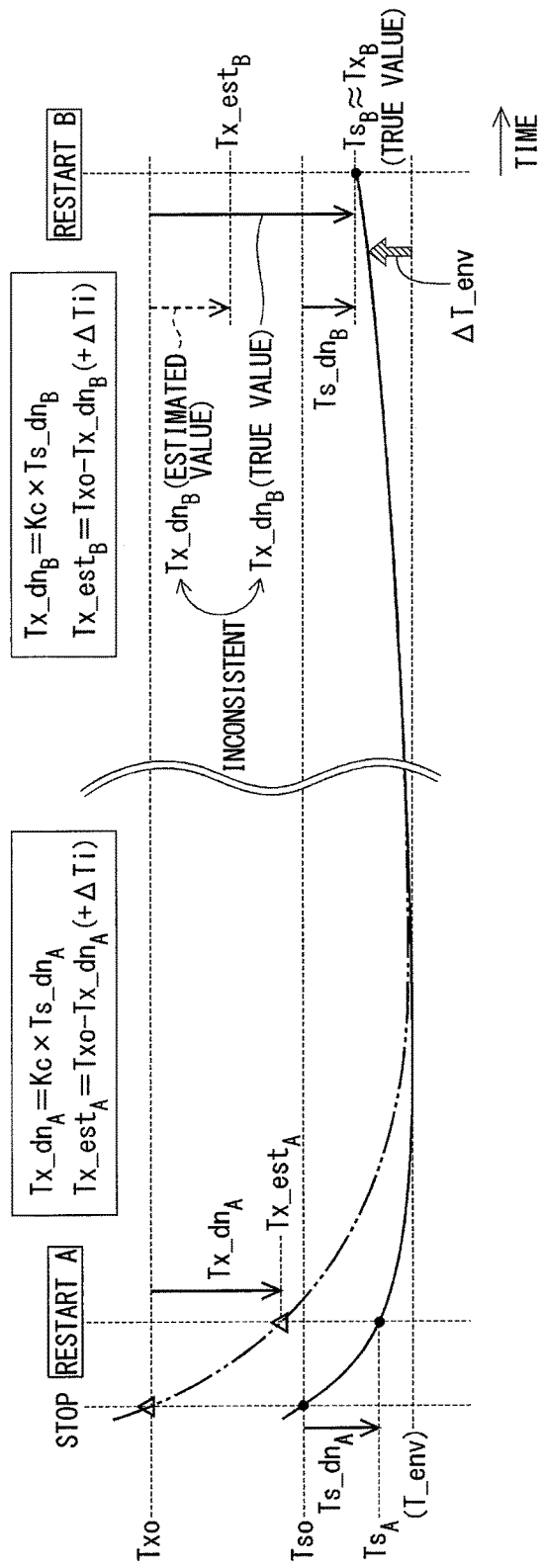
FIG. 10 is a time chart for explaining temperature estimation of the evaluation place of a comparative example.

As shown in FIG. 10, the estimated temperature Txo of the evaluation place is higher than the detected temperature Tso at the time of the halting. After the current supply is halted, true temperatures in the detection place of the temperature detector and the evaluation place change as respectively indicated by a solid line and a two-dot chain line. In a situation where the ambient temperature remains unchanged, the true temperatures in the detection place and the evaluation place gradually decrease due to natural cooling.

In the comparative example, it is assumed that the decreased temperatures in the detection place and the evaluation place after the lapse of the same time period from the operation halting are proportional to each other. Then, for example, attention is focused on the relation between a decreased temperature $Ts\_dn_A$ of the detected temperature and a decreased temperature $Tx\_dn_A$ of the estimated temperature of the evaluation place at the time of "restart A."

Note that a subscript "A" indicates a value at the time of the "restart A", to be discriminated from a value at the time of "restart B" described later. Descriptions of formulas will be given basically by use of symbols not including the subscripts A, B.

Returning to FIG. 9, at the time of the restart, the subtracter 95 subtracts the detected temperature Ts at the time of the restart from the detected temperature Tso at the time of the halting, to calculate a decreased temperature Ts_dn of the detected temperature. The multiplier 97 multiplies the decreased temperature Ts_dn of the detected temperature by a predetermined proportional coefficient Kc, to calculate a decreased temperature Tx_dn of the estimated temperature of the evaluation place. The proportional coefficient Kc is previously set from an experimental value, or the like. The decreased temperature Tx_dn of the estimated temperature of the evaluation place is expressed by Formula (5):

$$Tx\_dn = Kc \times Ts\_dn = Kc \times (Tso - Ts) \quad (5)$$

In the adder-subtracter 98, the decreased temperature Tx_dn of the estimated temperature of the evaluation place is subtracted from the estimated temperature Txo of the evaluation place at the time of the halting, and the increased temperature ΔTi due to energization at the time of the restart is further added, to calculate the estimated temperature Tx_est of the evaluation place at the time of the restart. That is, the estimated temperature Tx_est of the comparative example is expressed by Formula (6):

$$Tx\_est = Txo - Tx\_dn + \Delta Ti \quad (6)$$

In FIG. 10, it is regarded that "the increased temperature ΔTi≈0." At the time of the restart A, the estimated temperature $Tx\_est_A$ of the evaluation place can be estimated almost correctly even by the calculation method of the comparative example.

On the other hand, the "restart B" is a case where the both temperatures of the detection place and the evaluation place are decreased to temperatures equivalent to an ambient temperature T_env, and are thereafter increased again in association with an increase in the ambient temperature T_env. At this time, a detected temperature $Ts_B$ and a true temperature $Tx_B$ of the evaluation place are almost the same temperatures.

In this situation, a decreased temperature $Ts\_dn_B$ of the detected temperature is a smaller value by a quantity corresponding to an increase ΔT_env of the ambient temperature. For this reason, the decreased temperature $Tx\_dn_B$ of the estimated temperature of the evaluation place obtained by the same Formula (5) as that at the time of the restart A is calculated to be excessively small, and not consistent to the true value. Therefore, the estimated temperature $Tx\_est_B$ calculated by Formula (6) is also a wrong value.

Accordingly, when the current limit value $I_{LIM}$ is calculated based on the estimated temperature $Tx\_est_B$ by the comparative example, the energization of the motor 80 is controlled in a state where the true temperature $Tx_B$ of the evaluation place is not reflected. At the time of the restart B of FIG. 10, the estimated temperature $Tx\_est_B$ of the evaluation place is estimated to be higher than actual, resulting in that the current command value I* is excessively limited to cause meaningless deterioration in output performance of the motor 80. On the other hand, at the time of the restart in the case of the ambient temperature T_env having decreased during the halting period, the estimated temperature $Tx\_est_B$ of the evaluation place is estimated to be lower than actual, resulting in that the current command value I* is not sufficient limited, and the element might exceed a heat resistance limit, to be broken down.

In short, the temperature estimation at the time of the restart by the temperature estimation unit 90 of the comparative example is accomplished on the assumption that the ambient temperature T_env is stable during the halting period, and correct estimation cannot be performed when the ambient temperature T_env changes.

In contrast, in the temperature estimation by the temperature estimation unit 30 of the first embodiment, even when the ambient temperature T_env changes during the halting period, the temperature Tx of the evaluation place at the time of the restart can be correctly estimated.

Subsequently, the temperature estimation of the first embodiment will be described with reference to FIG. 7. In the comparative example, the temperature Tx of the evaluation place at the time of the restart is estimated by one temperature detector, based on the decreased temperature from the temperature Txo of the evaluation place at the time of the halting. In contrast, in the first embodiment, the temperature Tx of the evaluation place at the time of the restart is estimated by two temperature detectors based on the temperature difference with the first detected temperature Ts1 taken as a reference.

Figure 7:
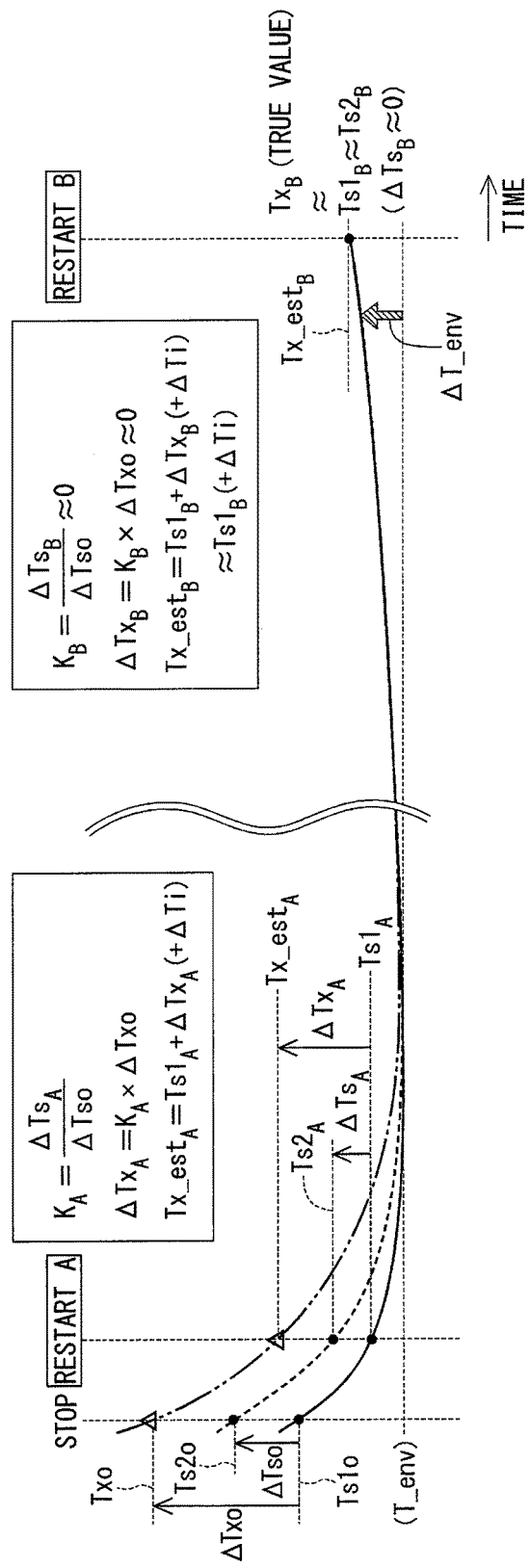
FIG. 7 is a time chart for explaining temperature estimation of the evaluation place of the first embodiment.

FIG. 7 shows a specific example of temperature estimation at the time of the "restart A" and at the time of the "restart B" in similar situations to FIG. 10 of the comparative example.

At the time of the halting, the estimated temperature Txo of the evaluation place is the highest, the second detected temperature Ts2o is in the middle, and the first detected temperature Ts2o is the lowest. The subtracters 33, 34 of FIG. 6 calculate "the temperature difference ΔTso between the first detected temperature Ts1o and the second detected temperature Ts2o" at the time of the halting and "the temperature difference ΔTxo between the first detected temperature Ts1o and the estimated temperature Txo of the evaluation place" at the time of the halting.

After the current supply is halted, true temperatures in the detection places of the first and second temperature detectors and the evaluation place gradually decrease as respectively indicated by a solid line, a broken line, and a two-dot chain line.

At the time of the "restart A", a ratio of "the temperature difference ΔTso between the first detected temperature Ts1o and the second detected temperature Ts2o at the time of the halting" and "a temperature difference $\Delta Ts_A$ between a first detected temperature $Ts1_A$ and a second detected temperature $Ts2_A$ at the time of the restart A" is calculated as an estimated gain $K_A$ by Formula (2).

Further, by Formula (3), "the temperature difference ΔTxo between the first detected temperature Ts1o and the estimated temperature Txo of the evaluation place at the time of the halting" is multiplied by the estimated gain $K_A$, to calculate "a temperature difference $\Delta Tx_A$ between the first detected temperature Ts1 and the estimated temperature of the evaluation place in a non-energization state at the time of the restart A."

Figure 8:
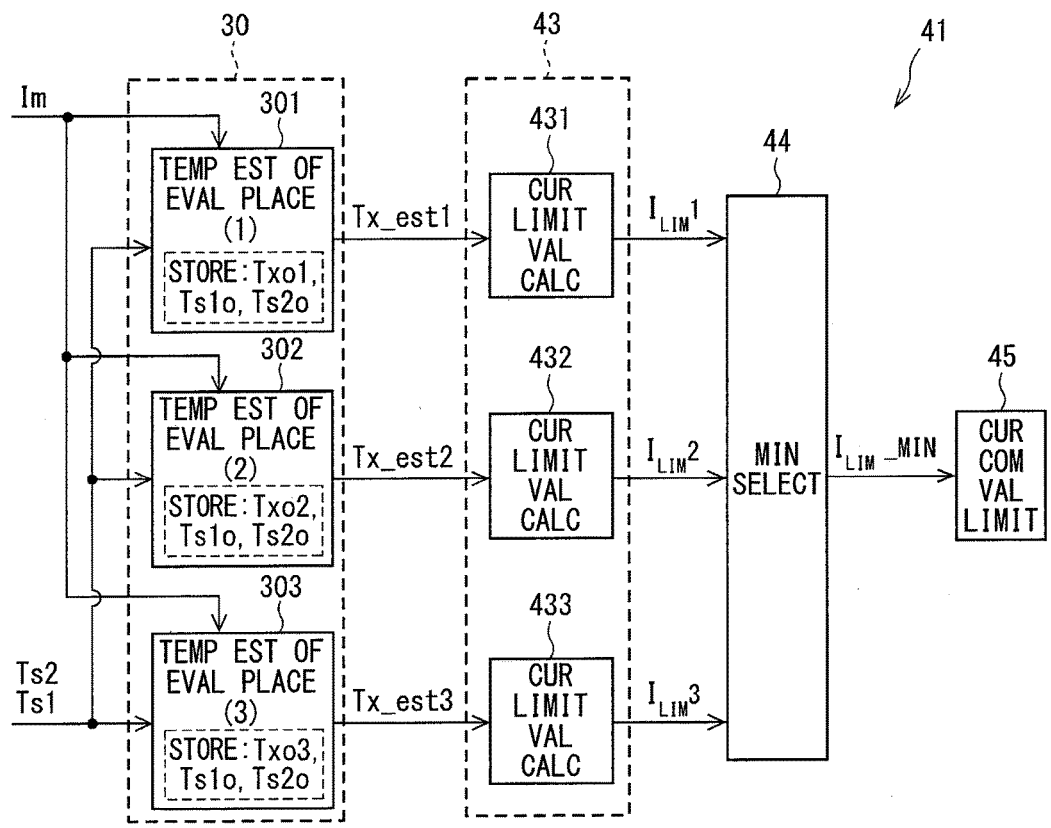
FIG. 8 is a block diagram showing a characteristic configuration of a motor control device of a second embodiment.

Similarly to FIG. 10, it is also regarded in FIG. 8 that "the increased temperature ΔTi≈0." Then, by Formula (4), the temperature difference $Tx_A$ is added to the first detected temperature $Ts1_A$ at the time of the restart A, thereby enabling correct estimation of the temperature $Tx\_est_A$ of the evaluation place at the time of the restart A.

At the time of the restart B, a first detected temperature $Ts1_B$, a second detected temperature $Ts2_B$, and a true temperature $Tx_B$ of the evaluation place are almost the same temperatures. Since a temperature difference $\Delta Ts_B$ between the first detected temperature $Ts1_B$ and the second detected temperature $Ts2_B$ is 0, an estimated gain $K_B$ calculated by Formula (2) is 0. A temperature difference $\Delta Tx_B$, calculated by multiplying the estimated gain $K_B$ by Formula (3), is also 0.

Accordingly, the estimated temperature $Tx\_est_B$ of the evaluation place at the time of the restart B calculated by Formula (4) can be made equal to the first detected temperature $Ts1_B$ at the time of the restart B. Hence in the first embodiment, the temperature $Tx\_est_B$ of the evaluation place at the time of the restart B can be correctly estimated without being affected by a change in the ambient temperature T_env.

Accordingly, by calculating the current limit value $I_{LIM}$ based on the estimated temperature $Tx\_est_B$ of the first embodiment, it is possible to appropriately prevent breakdown of the element, and control the energization of the motor 80 while holding the output of the motor 80 as high as possible.

For example, the steering assist motor of the electric power steering device is required to rapidly output large torque as compared with a motor to be used for steady rotation. Further, a place where the motor control device 10 is to be installed is generally an environment strictly restricted in terms of a space and disadvantageous in heat radiation. Furthermore, since the high reliability is required, it is particularly important to achieve both appropriate prevention of breakdown of the element and holding of the output of the motor 80 as high as possible. Hence the effect of correctly estimating the temperature Tx of the evaluation place at the time of the restart can be effectively exerted by the motor control device 10 of the present embodiment without being affected by a change in the ambient temperature T_env.

Further, as described above, the temperature detector 12 that detects the temperature Ths of the heat sink 20, a temperature of which is the lowest and stable, is preferably used as the first temperature detector. It is thereby possible to relatively stabilize the first detected temperature Ts1 that serves as a reference of the estimation.

Moreover, the configuration is assumed where temperature detector 14, 15 or 16 that detects the temperature of the control circuit IC 40, the drive circuit IC 50, or each of the switching elements 61 to 66 embedded in the IC package is provided. In this configuration, each of the temperature detectors 14, 15, 16 is preferably provided inside the IC package rather than being provided in the vicinity of an IC lead on the substrate 11. Hence it is possible to prevent the temperature detectors 14, 15, 16 from falling at the time of application of bending stress to the substrate 11, or some other time. The reliability is thereby improved.

Second Embodiment

A motor control device of a second embodiment will be described with reference to FIGS. 1 to 8. The second embodiment estimates temperatures of a plurality of evaluation places. The temperature estimation unit 30 includes temperature estimation units 301, 302, 303 that estimate temperatures of three evaluation places (1), (2), (3). The current control unit 41 further includes a MIN selection unit 44 between the current limit value calculation unit 43 and the current command value limitation unit 45 of FIG. 3.

The temperature estimation units 301, 302, 303 commonly acquire the first detected temperature Ts1, the second detected temperature Ts2, and the motor current Im. Further, the temperature estimation units 301, 302, 303 commonly store the first detected temperature Ts1o and the second detected temperature Ts2o at the time of the halting, and separately store temperatures Txo1, Txo2, Txo3 of the respective evaluation places at the time of the halting. Based on these pieces of information, the temperature estimation units 301, 302, 303 estimate temperatures Tx_est1, Tx_est2, Tx_est3 of the respective evaluation places (1), (2), (3) at the time of the restart of the current control unit 41 by a similar calculation to that in the first embodiment.

The current limit value calculation unit 43 of the current control unit 41 includes current limit value calculation units 431, 432, 433 respectively corresponding to the temperature estimation units 301, 302, 303. The current limit value calculation units 431, 432, 433 set current limit values $I_{LIM}1$, $I_{LIM}2$, $I_{LIM}3$ corresponding to estimated temperatures Tx_est1, Tx_est2, Tx_est3 by a map or the like, and output them to the MIN selection unit 44. At this time, a different map may be used for each evaluation place.

The MIN selection unit 44 selects a minimum value $I_{LIM}$_MIN from the current limit values $I_{LIM}1$, $I_{LIM}2$, $I_{LIM}3$, and outputs the minimum value $I_{LIM}$_MIN to a current command value limitation unit 45. The current command value limitation unit 45 limits the current command value I* by the minimum value $I_{LIM\_MIN}$ of the current limit value.

As thus described, in the second embodiment, the current command value I* is limited based on the estimated temperatures of the plurality of evaluation places, and hence the temperature information of each portion of the motor drive system can all be reflected to suppression of heat generation associated with energization. Further, from the viewpoint of giving priority to fail-safe, the current command value I* is limited by the minimum value $I_{LIM\_MIN}$ of the current limit value, and it is thereby possible to prevent breakdown of the element due to heat generation.

Other Embodiments (I) In FIG. 1, the temperature detector 12 that detects the temperature Ths of the heat sink 20 is installed in the ground channel portion on the substrate 11 that is in contact with the heat sink 20. Further, the temperature detector 18 that detects the temperature Tm of the motor 80 is installed near the current channel on the substrate 11 that is connected to each of the phase wires 81, 82, 83. The present disclosure is not limited to such a configuration, and the temperature detectors 12, 18 may be disposed in places away from the substrate 11, and may transmit the detected temperatures Ths, Tm to the temperature estimation unit 30 via signal lines, or the like.

(II) FIG. 1 shows the system that drives the three-phase AC motor by the inverter as the "power converter." Other than this, the motor control device of the present disclosure may be applied to a system that drives an AC motor of four or more phases. Further, the motor control device may be applied to a system that drives a DC motor by use of an H-bridge as the "power converter."

(III) It is considered that a configuration, in which the motor and the motor control device are adjacently disposed like a so-called mechatronically integrated system or united system as physical placement of the motor and the motor control device, has a tendency that the correlation between the detected temperature on the substrate and the estimated temperature of the motor is high when the motor is selected as the evaluation place. However, even in a mechatronically separate system in which the motor and the motor control device are connected by a cable, when there is a certain degree of correlation between the detected temperature on the substrate and the estimated temperature of the motor, it is effective to estimate the temperature of the motor by the above embodiment.

(IV) The second temperature detector desirably detects a temperature of a region having a heat capacity smaller than that of the detection place of the first temperature detector and larger than those of the other temperature estimation units that can each be the evaluation place. For example, the first temperature detector may detect the temperature of the heat sink 20 having the largest heat capacity, and the second temperature detector may detect the temperature of the motor 80 having the second largest heat capacity. Since a region having a larger heat capacity than those of the other temperature estimation regions gets cool more slowly, when one of the other regions is taken as the evaluation place in temperature estimation according to the above embodiment, the temperature of the evaluation place is not estimated to be low.

(V) The current control unit is not restricted to the configuration where the current limit value is variably set in accordance with the estimated temperature of the evaluation place. When the estimated temperature of the evaluation place exceeds a predetermined value, the operation of the system may be halted, or forcible cooling by a cooling fan or the like may be performed, depending on properties of the motor system.

(VI) The current value for estimating the increased temperature is not restricted to the detected value obtained by the current detector, but an estimated value may be used. For example, a current flowing in the inverter may be estimated based on inverter power and an inverter input voltage calculated by the number of rotation and torque of the motor.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A motor control device for controlling energization of a motor, the motor control device comprising:
   a substrate arranged on a heat sink to radiate heat generated at a time of energization;
   a plurality of switching elements arranged on the substrate and providing a power converter that supplies power to the motor;
   a drive circuit IC arranged on the substrate and having a pre-driver that outputs a drive signal to the plurality of switching elements;
   a control circuit IC arranged on the substrate and having a current control unit that calculates a command signal to the pre-driver based on an output command to the motor;
   a first temperature detector and a second temperature detector that detect temperature at two places of the heat sink, the control circuit IC, the drive circuit IC, the switching elements, and the motor; and
   a temperature estimation unit that estimates temperature of one or more evaluation places selected from the heat sink, the control circuit IC, the drive circuit IC, the switching elements and the motor, based on a current flowing through the motor, a first detected temperature detected by the first temperature detector and a second detected temperature detected by the second temperature detector, wherein:
   in a process where the current control unit is halted after operation and is restarted after halt, the temperature estimation unit:
      stores estimated temperature of the one or more evaluation places, the first detected temperature and the second detected temperature at a time of the halt of the current control unit;
      calculates, as an estimated gain, a ratio of a temperature difference between the first detected temperature and the second detected temperature at the time of the halt to a temperature difference between the first detected temperature and the second detected temperature at the time of restart; and
      estimates temperature of the one or more evaluation places at the time of the restart, based on a temperature difference obtained by multiplying a temperature difference between the first detected temperature and the estimated temperature of the one or more evaluation places at the time of the halt by the estimated gain, and an increased temperature calculated from an integrated value of the current flowing through the motor.

2. The motor control device according to claim 1 wherein:

at least one of the first temperature detector and the second temperature detector detects temperature of the control circuit IC, the drive circuit IC, or the switching elements embedded in an IC package; and the at least one of the first temperature detector and the second temperature detector is disposed in the IC package.

3. The motor control device according to claim 1 wherein:

the first temperature detector detects temperature of the heat sink.

4. The motor control device according to claim 3, wherein:

the first temperature detector detecting the temperature of the heat sink is arranged on the substrate, which contacts the heat sink.

5. The motor control device according to claim 1, wherein:

the higher the estimated temperature of the one or more evaluation places in a predetermined temperature range, the lower the current control unit sets a current limit value with respect to a current command value.

6. The motor control device according to claim 5, wherein:

the temperature estimation unit estimates the temperature of a plurality of the evaluation places; and the current control unit limits the current command value using a minimum value of a plurality of current limit values, which are set for each of the plurality of estimated temperature.

* * * * *

UNITED STATES PATENT AND TRADEMARK OFFICE
CERTIFICATE OF CORRECTION

PATENT NO. : 9,912,282 B2
APPLICATION NO. : 15/273476
DATED : March 6, 2018
INVENTOR(S) : Daisuke Kobayashi et al.

It is certified that error appears in the above-identified patent and that said Letters Patent is hereby corrected as shown below:

In the Specification

In Column 4 at Line 36, Change "Inn."" to --Im."--.

In Column 6 at Line 12, Change "ΔTI" to --ΔTi--.

Signed and Sealed this
Twenty-sixth Day of June, 2018

Andrei Iancu
*Director of the United States Patent and Trademark Office*